July 24, 1962
W. B. JOHNSON
3,045,764
CLOSE CUTTING CULTIVATOR
Filed Oct. 3, 1958
3 Sheets-Sheet 1
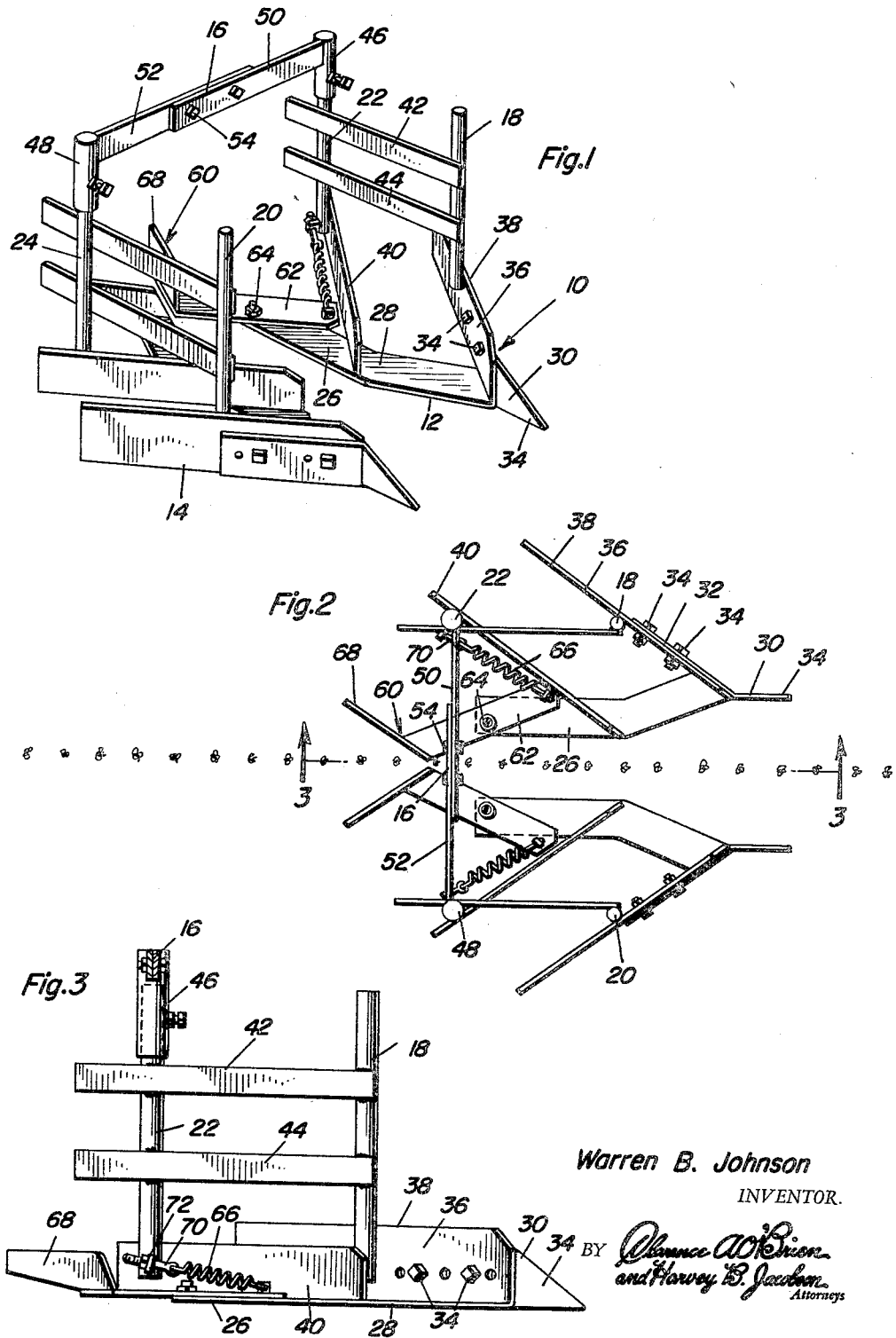
Warren B. Johnson
INVENTOR.

July 24, 1962  W. B. JOHNSON  3,045,764
CLOSE CUTTING CULTIVATOR
Filed Oct. 3, 1958  3 Sheets-Sheet 2
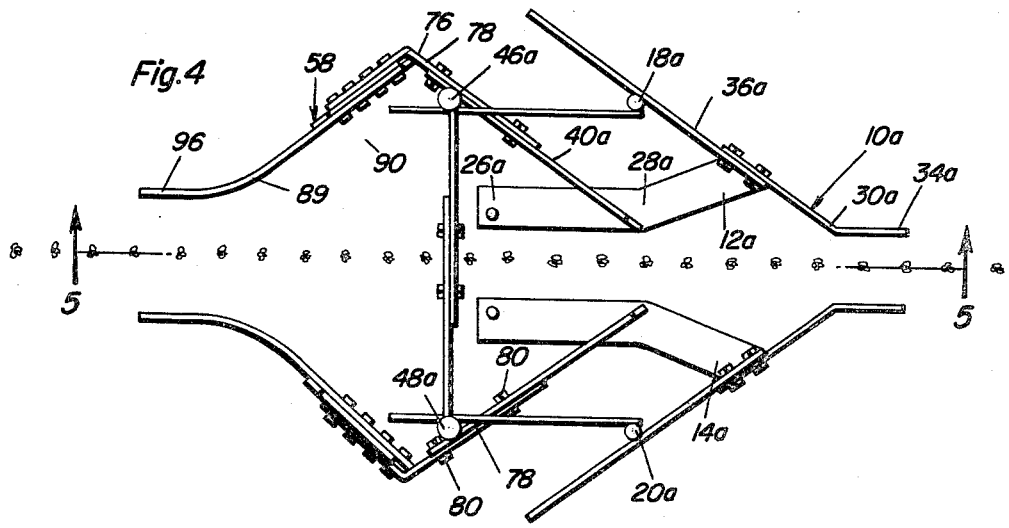
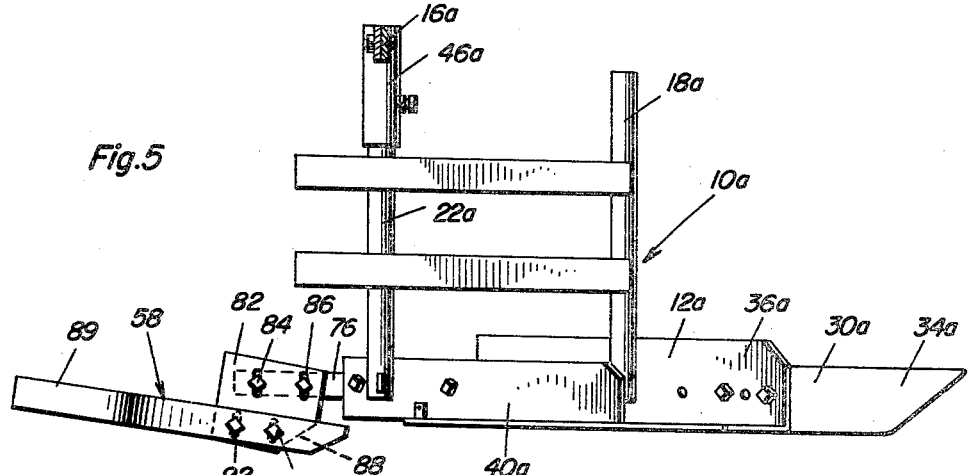
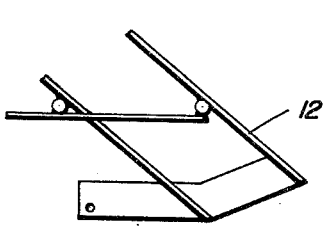
Warren B. Johnson
INVENTOR.

July 24, 1962 W. B. JOHNSON 3,045,764
CLOSE CUTTING CULTIVATOR
Filed Oct. 3, 1958 3 Sheets-Sheet 3
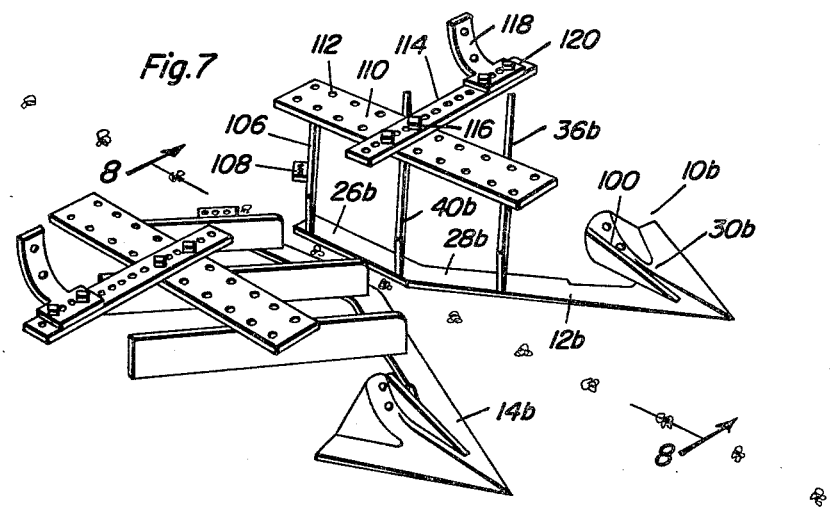
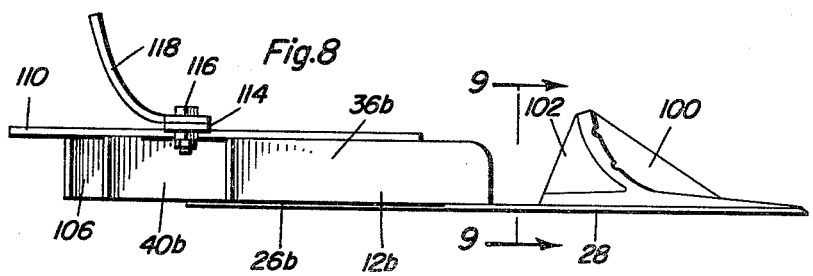
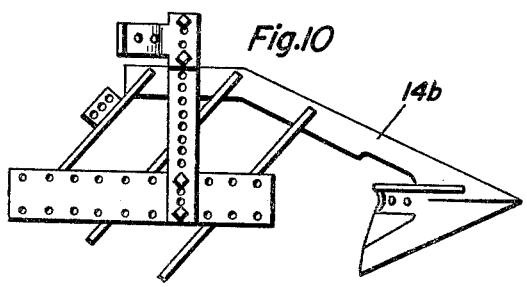
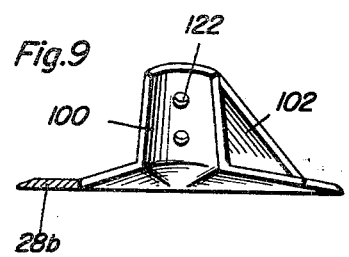
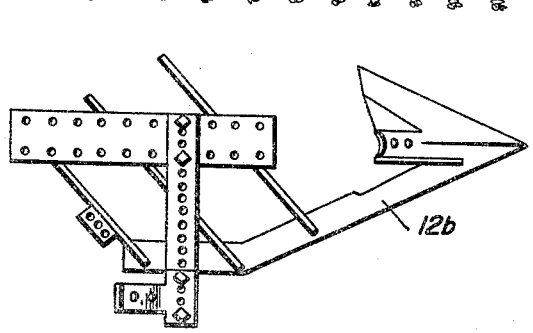
Warren B. Johnson
INVENTOR.

United States Patent Office 3,045,764  
Patented July 24, 1962

3,045,764  
CLOSE CUTTING CULTIVATOR  
Warren B. Johnson, R.R. 6, Box 64, Lubbock, Tex.  
Filed Oct. 3, 1958, Ser. No. 765,075  
5 Claims. (Cl. 172—191)

This invention relates to a close cutting plow that is principally useful in cultivating soil adjacent to cotton rows.

An object of the invention is to provide a plow capable of cutting close to the base of plants, particularly cotton plants, without danger of damaging the plants while removing soil from the base of these plants. One particular use is to cut from two to four inches of soil away from mature cotton stalks that have been heavily dirted in the regular practice of dirting cotton to control weeds.

One of the advantages in removing this dirt is to remove it from the low growing cotton bolls. A further advantage is to have it possible to operate mechanical harvesters lower on the cotton stalks thereby doing a more efficient job of mechanical harvesting.

One of the important features of the invention is found in the versatility of the plow. It is constructed of two units that are held spaced from each other, there being one right hand unit and one left hand unit. The units are so arranged that they may be interchanged that is, the left hand unit may be placed on the right hand side and the right hand unit placed on the left hand side in order to achieve a different operation on the soil. In one position the plow cultivates, cutting soil from plants and throwing it to the side. When interchanged, the units sweep the soil from the sides of the rows toward the plants. As a result of this interchange between units, the same cultivator may be used for the two above described procedures.

Another object of the invention is to provide a basic unit close cultivating implement on which attachments may be applied. One typical attachment is pivotally secured to the rear part of the basic unit and when properly adjusted forms a device that will cut the dirt from around the base of the cotton stalks and at the same time allow the stalks to pass freely therethrough. Another typical attachment is a dirting attachment which cuts or digs into the soil at a place laterally removed from the row, and sweeps the soil close up under the plants in the row. Other attachments may be used in coordination with the basic close cutting plow structure.

Another important feature of this invention is its attachment to a draft machine. The close cutting plow may be secured to the front clamps on a cultivator beam, that is, after the cultivator shanks are removed. Alternatively, special hardware may be used for attaching the plow to any draft machine such as a cultivator, tractor or the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a plow constructed in accordance with the invention, there being an attachment thereon for cutting the soil from around the base of the cotton stalks and at the same time allowing the cotton stalks to pass therethrough.

FIGURE 2 is a top view of the plow in FIGURE 1, this view showing the plow in use.

FIGURE 3 is a sectional view taken on the line 3—3 of FIGURE 2.

FIGURE 4 is a top view of the basic unit in the plow of FIGURE 1 but showing a dirting attachment in use.

FIGURE 5 is a sectional view taken on the line 5—5 of FIGURE 4.

FIGURE 6 is a diagrammatic plan view showing the right and left hand units of FIGURE 1 or FIGURE 2 interchanged so that the plow functions to sweep the soil in toward the row of plants.

FIGURE 7 is a perspective view of a modification of the invention.

FIGURE 8 is a sectional view taken on the line 8—8 of FIGURE 7.

FIGURE 9 is a cross-sectional view on enlarged scale and taken on the line 9—9 of FIGURE 8, showing principally the sweep construction.

FIGURE 10 is a top view of the plow in FIGURE 7, showing it in use.

In FIGURES 1–3 there is a cultivator or plow 10 which is symmetrical about its longitudinal central axis. There are two units 12 and 14 that are coupled by yoke 16, although the yoke is unnecessary in that the units 12 and 14 may be attached directly to a conventional cultivator bar after removal of the cultivator shanks, leaving open the cultivator shank clamps. The forward shank clamps may be attached to the two forward posts 18 and 20, and the rear shank clamps may be attached to rear posts 22 and 24, all posts rising vertically from units 12 and 14. As an option, only the front or only the rear posts may be used in the cultivator shank clamps, and where spacing allows, all of the posts 18, 20, 22 and 24 may be attached in the clamps of the cultivator.

The unit 12 is identical to unit 14 except unit 12 is a left hand unit and unit 14 is a right hand unit. The unit 12 is constructed of a wing section having a flat soil contacting plate 26. There is a flat longitudinal plate 28 preferably but not necessarily coplanar with plate 26, but arranged at an angle to the longitudinal axis of plate 26. Plate 28 extends laterally outwardly from the axis of plate 26 and has a sweep 30 at the front thereof. Sweep 30 has a flat part 32 (FIGURE 2) and a triangular pointed end 34 extending forwardly approximately parallel to the longtiudinal axis of the soil contacting plate 26. Flat part 32 of sweep 30 is connected by bolts 34 to the first shovel 36 of shovel section 38.

The shovel section 38 has shovel 36 and shovel 40 parallel to it. Each shovel is constructed of a substantially rectangular plate with shovel 36 formed integral with plate 28 or otherwise rigidly attached thereto along a part of its bottom edge. The shovels 36 and 40 are swept back with reference to the front of plow 10, each forming an acute included angle with the longitudinal axis of soil contacting plate 26 and the longitudinal central axis of plow 10. Post 18 is welded or otherwise secured to shovel 36, and post 22 is welded or otherwise secured to shovel 40. Braces 42 and 44 are secured to the two posts 18 and 22, extending between them in order to form a rigid construction. When used, yoke 16 is attached to the upper extremities of posts 22 and 24 by having sockets 46 and 48 at the outer extremities of extensibly connected bars 50 and 52. The bars are attached together by bolts 54 that are passed through openings in bar 50 and through slotted openings in bar 52. Should a fixed width yoke be desired, the two bars 50 and 52 may be substituted for by a single bar.

The construction of unit 28 as described above is the same in the embodiment of FIGURES 1 and 4 respectively, the distinction between these plows being found only in the attachments 58 and 60 respectively. Attachment 58 is secured to the plow in FIGURE 4 and is a dirting attachment. Attachment 60 is secured to the plow in FIGURE 1 and is a soil cutting attachment adapted to operate close to the base of the cotton stalks and at the same time allow the stalks to pass freely therethrough. Attachment 60 is duplicated (FIGURE 2) there being one attachment on each unit 12 and 14. The typical attachment 60 is composed of a flat lever 62 fitting flush on the top surface of soil contacting plate 26 and removably mounted by a single pivot pin 64 passed through an opening in lever 62 in between the ends of the lever. One end of the lever has a spring 66 attached to it. The spring constitutes a portion of resilient means for yieldingly retaining the lever and essentially vertical soil working plate 68 in a selected position, although the lever and the plate 68 may be flexed due to the resiliency of spring 66. The opposite end of spring 66 is attached to a turnbuckle bolt 70 that is passed through an opening in ear 72 welded or otherwise fixed to the lower part of post 22. There is a nut on bolt 72 in order to adjust the position of bolt 70 in bracket 72 and thereby adjust the tension of spring 66. As shown in FIGURE 2 the soil working plate 68 is attached to lever 62 at an angle so that plate 68 is roughly parallel to shovels 36 and 40.

In use, the plow 10 is mounted in one of the ways that have been described previously. It is drawn through a field with units 12 and 14 on opposite sides of a row, for instance a row of cotton plants. Sweeps 30 work the soil while shovels 36 and 40 direct it away from the rows. In the area very close to the plants, the plates 68 function in the nature of shovels and diggers, cutting away between two and four inches (preferably) of soil very close to the base of each plant and beneath the lower bolls of the plants.

In FIGURES 4 and 5 plow 10a is made of the same basic units 12a and 14a that are identical in every respect to units 12 and 14. The only distinction between the embodiment in FIGURES 4 and 5 and that disclosed in FIGURES 1 and 3 is in the dirting attachment 58. There is a left hand dirting attachment on left hand unit 12a and a right hand dirting attachment on unit 14a. Attachment 58 is composed of an approximately right angular bracket 76 having one part 78 fitting flush against the outside surface of the second shovel 40 and held bolted in place. Bolts 80 may be used for this purpose. Bracket 76 has a rear part to which flat dirt digging plate 82 is secured by bolts 84 that are passed through slotted openings 86 in plate 82 and apertures in bracket 76. An angulated cutting edge 88 is at the lower front edge of plate 82. Soil guide 89 is attached by bolts 90 entering slotted openings 92 in plate 82 and holes in guide 89. The attachment is made to the digger plate 82 with soil guide 89 having an outcurved rear part 96 provided with a substantial portion approximately parallel to the longitudinal central axis of plow 10a. In use, attachment 58 returns a portion of the soil along the sides of the row. Further, note that the sweeps 30a are brought in closer to each other so that the forward pointed ends 34a thereof are closer to the plants than when used as in FIGURE 2. Accordingly, the initial cut is made closer to the plants, but the soil guides 89 sweep the soil at the rear end of plow 10a to a returned position at the sides of the row, thereby performing the customary dirting operation.

Attention is now invited to FIGURE 6. In this figure there are units 14 and 12 respectively, these being absolutely identical to units 14a and 12a. This figure diagrammatically represents the plow as it would appear when used without attachments or with attachments removed but with the left hand unit on the right side and the right hand unit on the left side. When operated in this way the units themselves function as an excellent implement for dirting. The shovels of the units sweep the soil from alongside of the row to a position toward the row of plants.

FIGURES 7-10 illustrate a modification of the invention. Here again, plow 10b is made of two essentially identical units 12b and 14b. Sweep 30b is of different construction, being V-shaped when viewed from above and having an upstanding reinforcing rib 100 extending from the apex of the V-shaped sweep rearwardly and upwardly and reinforced by reinforcing webs 102 at its sides. The wing section has a soil contacting plate 26b the same as the previously described soil contacting plates, together with a longitudinal plate 28b at its forward end. The shovel section has a first shovel 36b, a second parallel shovel 40b and a third parallel shovel 106, each attached to the essentially flat sweep section plates 28 and 28b. The third shovel 106 is located at the rearmost part of the wing section and has a mounting bracket 108 provided with a multiplicity of apertures within which to accommodate a mounting bolt or mounting bolts. The means fastening unit 12b to a cultivator, tractor or some other draft implement are universal to the extent that there is a flat upper plate 110 provided with numerous holes 112. The flat upper plate is secured to the shovels 36b, 40b and 106 and it has a transverse apertured plate 114 adustable secured thereto by bolts 116. Apertured plate 114 may be moved forward or rearward or to the side or to an angular position on plate 110 and locked in place by means of bolts 116. Mounting bracket 118 is attached by bolts 120 to apertured plate 114 and here again, mounting bracket is formed with a multiplicity of holes and may be secured to plate 114 in one of a selection of numerous possible positions due to the number of holes in bracket 118 and plate 114. As illustrated, sweep 30b has a plurality of openings 122, and these too, may be used for receiving bolts that attach braces to the sweep and to the draft machine, for instance a cultivator or tractor.

In use of this form of the invention, the same exchange between left hand and right hand units may be resorted to as seen by a comparison of FIGURES 7 and 10. The purpose in making the exchange between units is the same as that described in connection with the previously considered embodiments of the invention.

This is a continuation-in-part application of U.S. Serial No. 679,634 which was filed on August 22, 1957, now abandoned. For all the subject matter common to this and the earlier filed application, the benefit of the earlier filed application is claimed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A close cutting cultivator of the type having at least one pair of wing shovel sections adapted to straddle a row of cotton plants and be moved longitudinally therealong to either remove quantities of soil from around the plant stalks or to perform dirting operations; said wing shovel sections each comprising at least one pair of longitudinally spaced and approximately parallel, straight, horizontally disposed and upstanding shovel plates, means rigidly interconnecting the forward portions of said shovel plates, means carried by said shovel sections adapting said sections for securement to a support member in side-by-side relation and with said plates projecting laterally to opposite sides of and rearwardly from the longitudinal center axis of said cultivator extending between said wing shovel sections and with the forward edges of said plates being spaced from said center axis, said securing means including bracing means which rigidly interconnects the rear portions of said sections and interchangeably supports said sections therefrom whereby soil may be moved differently in accordance with the positions of said sections.

2. The combination of claim 1 including a longitudinally extending and forwardly projecting sweep secured to the forward edge of each of the forwardmost plates, 3. The combination of claim 1 including a soil working attachment secured to each of said sections including a deflector plate, said attachments each comprising a lever having said deflector plate attached at one end, means pivotally mounting each of said levers to a section for rotation about a vertical axis with said deflector movable between a position approximately parallel to said shovel plates with the forward end of the deflector closely adjacent the longitudinal center axis of said cultivator inward of the forward ends of said shovel plates and a position pivoted outwardly away from the longitudinal center axis of said cultivator, and means resiliently urging said lever toward said first mentioned position whereby soil may be removed from positions closely adjacent the center of the rows of cotton plants while still enabling the passage of the stalks of the cotton plants between opposing pairs of deflector plates.

4. The combination of claim 1 wherein said securing means on each section for securing that section to said support member includes an upright post projecting above said shovel plates and adapted for securement to support member clamps, each of said shovel plates having one of said upright posts secured thereto.

5. The combination of claim 1 wherein said interconnecting means of each section includes a generally flat soil contacting plate having a rear portion extending longitudinally of said section and a laterally deflected forward portion angled forwardly and outwardly to the same side of the corresponding section to which the rear ends of said shovel plates project, the soil contacting plate of each section having the forward edges of the corresponding shovel plates rigidly secured thereto.

References Cited in the file of this patent

UNITED STATES PATENTS

| | | |
|---|---|---|
| 467,415 | Hurley et al. | Jan. 19, 1892 |
| 597,644 | Gongwer | Jan. 18, 1898 |
| 852,295 | Purnell | Apr. 30, 1907 |
| 1,051,012 | Ruff | Jan. 21, 1913 |
| 1,188,184 | Koch | June 20, 1916 |
| 1,205,967 | Billington | Nov. 28, 1916 |
| 1,700,117 | Booth | Jan. 29, 1929 |
| 2,558,154 | Porter | June 26, 1951 |

FOREIGN PATENTS

| | | |
|---|---|---|
| 517,542 | Belgium | Feb. 28, 1953 |
| 736,499 | France | Sept. 19, 1932 |
| 746,735 | France | Mar. 14, 1933 |
| 754,753 | France | Oct. 28, 1933 |